(12) United States Patent
Kosydar et al.

(10) Patent No.: US 8,936,357 B2
(45) Date of Patent: Jan. 20, 2015

(54) INKJET PRINTER WITH INKS CONTAINING POLYOXYGENATED-POLYOLS

(75) Inventors: Karen M. Kosydar, Penfield, NY (US); Richard P. Szajewski, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 1607 days.

(21) Appl. No.: 12/164,653

(22) Filed: Jun. 30, 2008

(65) Prior Publication Data

US 2009/0322842 A1    Dec. 31, 2009

(51) Int. Cl.
*B41J 2/01*    (2006.01)
*C09D 11/38*    (2014.01)
*C09D 11/322*    (2014.01)

(52) U.S. Cl.
CPC ............. *C09D 11/38* (2013.01); *C09D 11/322* (2013.01)
USPC ............................................. 347/100; 347/95

(58) Field of Classification Search
USPC .............. 347/100, 95, 96, 101; 523/160, 161; 106/31.13, 31.27, 31.6
See application file for complete search history.

(56) References Cited

U.S. PATENT DOCUMENTS

| | | | |
|---|---|---|---|
| 5,169,437 A | 12/1992 | You | |
| 5,180,425 A | 1/1993 | Matrick et al. | |
| 5,356,464 A | 10/1994 | Hickman et al. | |
| 5,656,071 A | 8/1997 | Kappele et al. | |
| 5,679,138 A * | 10/1997 | Bishop et al. | 347/100 |
| 5,746,814 A | 5/1998 | Malhortra et al. | |
| 6,086,661 A | 7/2000 | Malhotra et al. | |
| 6,538,049 B1 * | 3/2003 | Kappele et al. | 523/160 |
| 6,641,257 B1 | 11/2003 | Shi et al. | |
| 6,676,736 B2 | 1/2004 | Nakano et al. | |
| 2005/0119368 A1 * | 6/2005 | Hall-Goulle et al. | 523/160 |
| 2006/0100306 A1 * | 5/2006 | Yau et al. | 523/160 |
| 2009/0169762 A1 * | 7/2009 | Szajewski et al. | 106/31.65 |

FOREIGN PATENT DOCUMENTS

| | | |
|---|---|---|
| JP | 2004/018466 | 1/1992 |
| JP | 2002/121446 | 10/2000 |
| JP | 2004/059760 | 7/2002 |

\* cited by examiner

*Primary Examiner* — Manish S Shah
(74) *Attorney, Agent, or Firm* — Andrew J. Anderson

(57) ABSTRACT

An inkjet printer contains an aqueous inkjet ink exhibiting good jetting reliability and ink storage stability, including:
a) water;
b) colored pigment exhibiting a median volume weighted $50^{th}$ percentile particle size of less than 0.11 microns;
c) from 0.1% to 4% by weight of a compound I represented by the following Structure (I):

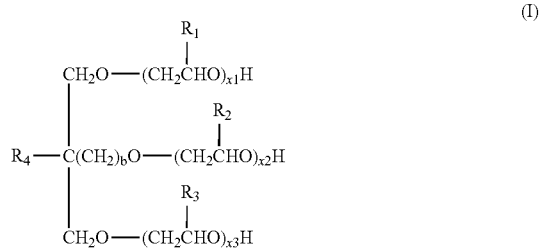

d) and a polyurethane latex binder.

19 Claims, 1 Drawing Sheet

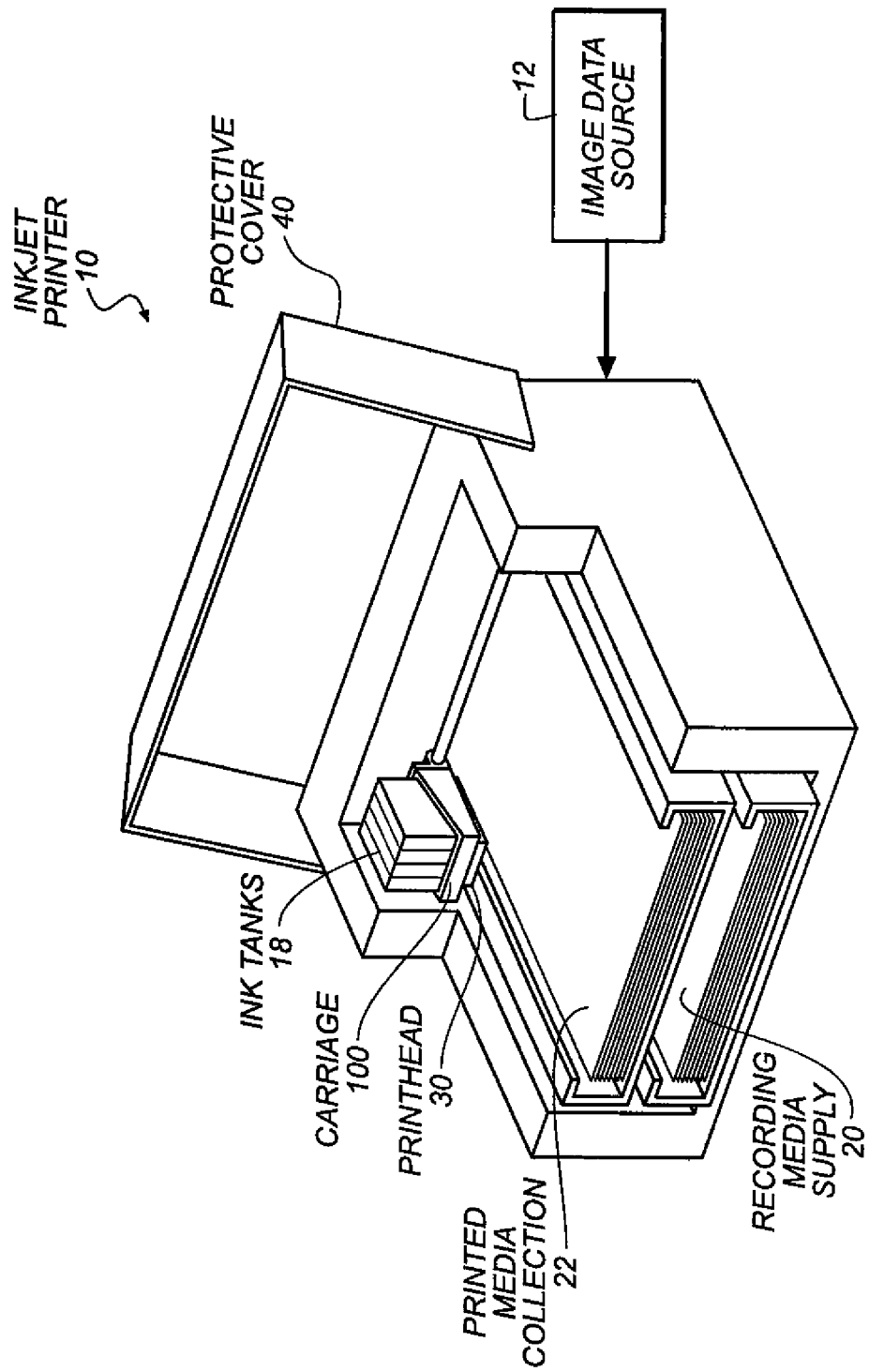

INKJET PRINTER WITH INKS CONTAINING POLYOXYGENATED-POLYOLS

FIELD OF THE INVENTION

The invention relates to inkjet printers containing inkjet inks comprising fine-grained pigment particles, polyoxygenated polyols and a polyurethane latex polymer as well as inkjet inkjets comprising such inks, the inks themselves, and methods of applying such inks to media.

BACKGROUND OF THE INVENTION

Inkjet printing is a non-impact method for producing printed images by the deposition of ink droplets in a pixel-by-pixel manner to an image-recording element in response to digital data signals. There are various methods that can be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers and thermal bubble formation. In another process, known as continuous inkjet, a continuous stream of droplets is charged and deflected in an image-wise manner onto the surface of the image-recording element, while un-imaged droplets are caught and returned to an ink sump. Inkjet printers have found broad applications across markets ranging from desktop document and photographic-quality imaging, to short run printing and industrial labeling.

Early inkjet inks were formulated much like conventional printing or pen-applied inks. As greater attention has been directed towards printing speed, ease of use, reliability, and environmental issues and with increasing interest in forming improved images, inks have been formulated to work well on specific media. For example, inks intended to provide durable and glossy images on photo-glossy image receivers can incorporate film forming polymers and soluble dye colorants while inks intended to provide well adhering fast drying, smooth images on plain papers can include soluble dye colorants, paper penetrants and paper anti-curl agents. The soluble dye inks all suffer from light fade, a problem that is especially significant when archival photo-images are desired and from poor resistance to rewetting. It has been proposed to alleviate the light fade problem by providing dispersed pigment as colorants in place of soluble dyes. However, use of pigments often leads to a reduction in image gloss and poor rub resistance on coated media such as photo-glossy media and image inhomogeneity or mottle on plain papers and related untreated media. Jetting has been improved by the use of polymers intended to act as jetting aids.

However, jetting reliability and ink storage stability remains an issue especially with pigmented inks when a low-density forming or light ink is desired as in the preparation and use of the so-called photo-inks and in proofing inks.

SUMMARY OF THE INVENTION

An inkjet printer containing an aqueous inkjet ink, comprising:
a) at least 50% by weight water;
b) from 0.1% to 3% by weight of dispersed colored pigment exhibiting a median volume weighted $50^{th}$ percentile particle size of less than 0.11 microns;
c) from 0.1% to 4% by weight of a compound I represented by the following Structure (I):

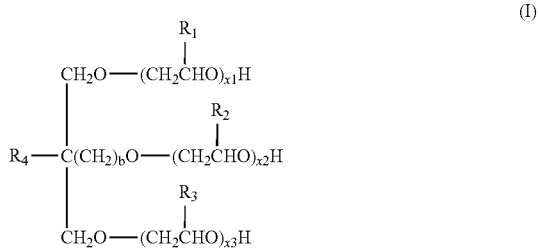

wherein $R_4$ is chosen from the group consisting of —H, —$CH_3$, —$C_2H_5$, —$C_3H_7$, and —$CH_2O(CH_2CHR_5O)_{x4}H$;
1) provided when $R_4$ is —H, —$CH_3$, —$C_2H_5$, or —$C_3H_7$, each of $R_1$, $R_2$, and $R_3$ are independently hydrogen or methyl, b is 0 or 1; $x_1$, $x_2$ and $x_3$ are each equal to at least 1, and the sum of $x_1$, $x_2$, and $x_3$ is 3 to 21; and
2) provided when $R_4$ is —$CH_2O(CH_2CHR_5O)_{x4}H$, each of $R_1$, $R_2$, $R_3$, and $R_5$ is independently hydrogen or methyl; b is 0 or 1 and the sum $x_1$, $x_2$, $x_3$, and $x_4$ is from 3 to 28;
d) a polyurethane latex binder in an amount from 0.05% to 3% by weight;
e) optionally, a water soluble polyacrylate polymer in an amount less than 3% by weight;
f) provided that the sum of the polyurethane latex binder and any water soluble polyacrylate polymer is not more than 3% by weight; and
g) further provided that the weight ratio of dispersed pigment to the sum of all water soluble polyacrylate polymer and polyurethane latex binder is from 3:1 to 1:2.

The invention also provides an inkjet set, the inks themselves, and a method for printing using an inkjet printer. The printer, ink set, ink, and method of the invention provide improved jetting reliability and ink storage.

BRIEF DESCRIPTION OF THE DRAWING

The FIGURE is a schematic view of an inkjet printer useful in the invention.

DETAILED DESCRIPTION OF THE INVENTION

The invention is summarized above. Inkjet printing systems useful in the invention comprise a printer, at least one ink, and an image recording element, typically a sheet, (herein also "media"), suitable for receiving ink from an inkjet printer. The method of the invention employs the inkjet printer of the invention to provide an image on media. Inkjet printing is a non-impact method for producing printed images by the deposition of ink droplets in a pixel-by-pixel manner to an image-recording element in response to digital data signals. There are various methods that may be utilized to control the deposition of ink droplets on the image-recording element to yield the desired printed image. In one process, known as drop-on-demand inkjet, individual ink droplets are projected as needed onto the image-recording element to form the desired printed image. Common methods of controlling the projection of ink droplets in drop-on-demand printing include piezoelectric transducers, thermal bubble formation or an actuator that is made to move.

Drop-On-Demand (DOD) liquid emission devices have been known as ink printing devices in inkjet printing systems for many years. Early devices were based on piezoelectric actuators such as are disclosed by Kyser et al. in U.S. Pat. No. 3,946,398; and Stemme in U.S. Pat. No. 3,747,120. A currently popular form of inkjet printing, thermal inkjet (or "thermal bubble jet"), uses electrically resistive heaters to generate vapor bubbles which cause drop emission, as is discussed by Hara et al. in U.S. Pat. No. 4,296,421. In another process, known as continuous inkjet, a continuous stream of droplets is generated, a portion of which are deflected in an image-wise manner onto the surface of the image-recording element, while un-imaged droplets are caught and returned to an ink sump. Continuous inkjet printers are disclosed in U.S. Pat. Nos. 6,588,888; 6,554,410; 6,682,182; 6,793,328; 6,866,370; 6,575,566; and 6,517,197.

The FIGURE shows one schematic example of an inkjet printer 10 that includes a protective cover 40 for the internal components of the printer. The printer contains a recording media supply 20 in a tray. The printer includes one or more ink tanks 18 (shown here as having four inks) that supply ink to a printhead 30. The printhead 30 and ink tanks 18 are mounted on a carriage 100. The printer includes a source of image data 12 that provides signals that are interpreted by a controller (not shown) as being commands to eject drops of ink from the printhead 30. Printheads may be integral with the ink tanks or separate. Exemplary printheads are described in U.S. Pat. No. 7,350,902. In a typical printing operation a media sheet travels from the recording media supply 20 in a media supply tray to a region where the printhead 30 deposits droplets of ink onto the media sheet. The printed media collection 22 is accumulated in an output tray. In another specifically contemplated embodiment, the printable media is supplied in roll form and printed output is detached after printing. Any known printable media can be employed.

Suitably, the dispersed pigment useful in the invention is chosen from the group consisting of a surfactant dispersed, self-dispersed or encapsulating-dispersant dispersed pigment. In one embodiment, the dispersed pigment is a surfactant dispersed pigment. When the dispersed pigment is a surfactant dispersed pigment, the dispersing surfactant is preferably a metal salt of oleylmethyltaurate. While any suitable metal salt can be employed, sodium or potassium cations are most preferred. The dispersed colored pigment can be of any suitable color but is preferably chosen from the group consisting of cyan, magenta, yellow, red, green, blue, violet, orange, and black colored pigments. While any Compound I according to the structure can be employed, in one mode the compound comprises four hydroxyl groups. In another mode, $R_4$ is —CH$_2$O(CH$_2$CHR$_5$O)$_{x4}$H and $R_5$ is hydrogen or methyl. In a further mode, the compound of structure I is present from 1% to 3% by weight. In another embodiment, Compound I according to the structure comprises three hydroxyl groups and three polyoxyethylene or polyoxypropylene branches. The water soluble polyacrylate polymer preferably exhibits an acid number from 100 to 400 and a weight average molecular weight Mw from 5,000 to 20,000. The polyurethane latex binder preferably exhibits an acid number from 60 to 150 and a weight average molecular weight Mw from 7,500 to 30,000.

The benefits of the invention are further provided by an inkjet ink set comprising at least two distinctly colored inks, both according to the formulation described above. In yet another embodiment, the benefits of the invention are provided by an inkjet ink set comprising at least two commonly colored inks, at least one of which is an ink according to the formulation described above. In yet another embodiment, the benefits of the invention are provided by an inkjet recording method comprising the step of applying to a paper by thermal or piezo ejection an ink according to the formulation described above.

While ink compositions known in the art of inkjet printing can be aqueous- or solvent-based, and in a liquid, solid or gel state at room temperature and pressure. Aqueous-based ink compositions are preferred in the present invention because they are more environmentally friendly as compared to solvent-based inks, plus most printheads are designed for use with aqueous-based inks. By aqueous inks is meant that the ink composition comprises at least 50% and, suitably, at least 65% by weight water.

The ink composition can be colored with pigments, dyes, polymeric dyes, loaded-dye/latex particles, or any other types of colorants, or combinations thereof. Pigment-based ink compositions are preferred in the invention because such inks render printed images having higher optical densities, and better fade resistance to light and ozone exposure as compared to printed images made from other types of colorants. The ink composition can be yellow, magenta, cyan, black, gray, red, violet, blue, green, orange, brown, etc. The ink is colored by the dispersed pigment colorant. The inks of the invention can have one pigment colorant or mixtures of more that one pigment colorant.

The dispersed colored pigments are present in toto at from 0.1% to 3% by weight in the inks. In one mode, the dispersed colored pigments are present at from 0.2% to 2% by weight and in a convenient mode are present at from 0.4% to 1.1% by weight. When mixtures of pigments are employed, the individual dispersed colored pigments are present typically at from 0.05% to 2% by weight. The dispersed pigment colorant exhibits a median volume weighted $50^{th}$ percentile particle size of less than 0.11 microns. The ink desirably has dispersed pigment colorant particles exhibiting a median volume weighted $50^{th}$ percentile particle size of from 0.001 to 0.09 microns. Suitably, the ink has dispersed pigment colorant particles exhibiting a median volume weighted $50^{th}$ percentile particle size of from 0.008 to 0.08 microns. Smaller pigment particles may form less stable images, while larger pigment particles may fail to provide adequate gloss characteristics on some printing media.

A wide variety of organic and inorganic pigments, alone or in combination with additional pigments or dyes can be used in the ink composition of the present invention. Pigments that can be used in the invention include those disclosed in, for example, U.S. Pat. Nos. 5,026,427; 5,086,698; 5,141,556; 5,160,370; and 5,169,436. The exact choice of pigments will depend upon the specific application and performance requirements such as color reproduction and image stability.

Pigments suitable for use in the invention include, but are not limited to, azo pigments, monoazo pigments, di-azo pigments, azo pigment lakes, β-Naphthol pigments, Naphthol AS pigments, benzimidazolone pigments, di-azo condensation pigments, metal complex pigments, isoindolinone and isoindoline pigments, polycyclic pigments, phthalocyanine pigments, quinacridone pigments, perylene and perinone pigments, thioindigo pigments, anthrapyrimidone pigments, flavanthrone pigments, anthanthrone pigments, dioxazine pigments, triarylcarbonium pigments, quinophthalone pigments, diketopyrroto pyrrole pigments, titanium oxide, iron oxide, and carbon black.

Typical examples of pigments that can be used include Color Index (C.I.) Pigment Yellow 1, 2, 3, 5, 6, 10, 12, 13, 14, 16, 17, 62, 65, 73, 74, 75, 81, 83, 87, 90, 93, 94, 95, 97, 98, 99, 100, 101, 104, 106, 108, 109, 110, 111, 113, 114, 116, 117, 120, 121, 123, 124, 126, 127, 128, 129, 130, 133, 136, 138, 139, 147, 148, 150, 151, 152, 153, 154, 155, 165, 166, 167, 168, 169, 170, 171, 172, 173, 174, 175, 176, 177, 179, 180, 181, 182, 183, 184, 185, 187, 188, 190, 191, 192, 193, 194; C.I. Pigment Red 1, 2, 3, 4, 5, 6, 7, 8, 9, 10, 11, 12, 13, 14, 15, 16, 17, 18, 21, 22, 23, 31, 32, 38, 48:1, 48:2, 48:3, 48:4, 49:1, 49:2, 49:3, 50:1, 51, 52:1, 52:2, 53:1, 57:1, 60:1, 63:1, 66, 67, 68, 81, 95, 112, 114, 119, 122, 136, 144, 146, 147, 148, 149, 150, 151, 164, 166, 168, 169, 170, 171, 172, 175, 176, 177, 178, 179, 181, 184, 185, 187, 188, 190, 192, 194, 200, 202, 204, 206, 207, 210, 211, 212, 213, 214, 216, 220, 222, 237, 238, 239, 240, 242, 243, 245, 247, 248, 251, 252, 253, 254, 255, 256, 258, 261, 264; C.I. Pigment Blue 1, 2, 9, 10, 14, 15:1, 15:2, 15:3, 15:4, 15:6, 15, 16, 18, 19, 24:1, 25, 56, 60, 61, 62, 63, 64, 66, bridged aluminum phthalocyanine pigments; C.I. Pigment Black 1, 7, 20, 31, 32; C.I. Pigment Orange 1, 2, 5, 6, 13, 15, 16, 17, 17:1, 19, 22, 24, 31, 34, 36, 38, 40, 43, 44, 46, 48, 49, 51, 59, 60, 61, 62, 64, 65, 66, 67, 68, 69; C.I. Pigment Green 1, 2, 4, 7, 8, 10, 36, 45; C.I. Pigment Violet 1, 2, 3, 5:1, 13, 19, 23, 25, 27, 29, 31, 32, 37, 39, 42, 44, 50; or C.I. Pigment Brown 1, 5, 22, 23, 25, 38, 41, 42.

The preferred pigment-based ink compositions employing surfactant dispersed pigments that are useful in the invention can be prepared by any known method. Useful methods commonly involve two steps: (a) a dispersing or milling step to break up the pigments to primary particles, where primary particle is defined as the smallest identifiable subdivision in a particulate system, and (b) a dilution step in which the pigment dispersion from step (a) is diluted with the remaining ink components to give a working strength ink.

The milling step (a) is carried out using any type of grinding mill such as a media mill, a ball mill, a two-roll mill, a three-roll mill, a bead mill, and air-jet mill, an attritor, or a liquid interaction chamber. In the milling step (a), pigments are optionally suspended in a medium that is typically the same as or similar to the medium used to dilute the pigment dispersion in step (b). Inert milling media are optionally present in the milling step (a) in order to facilitate break up of the pigments to primary particles. Inert milling media include such materials as polymeric beads, glasses, ceramics, metals and plastics as described, for example, in U.S. Pat. No. 5,891, 231. Milling media are removed from either the pigment dispersion obtained in step (a) or from the ink composition obtained in step (b).

A dispersant is optionally present in the milling step (a) in order to facilitate break up of the pigments into primary particles. For the pigment dispersion obtained in step (a) or the ink composition obtained in step (b), a dispersant is optionally present in order to maintain particle stability and prevent settling. Dispersants suitable for use in the invention include, but are not limited to, those commonly used in the art of inkjet printing. For aqueous pigment-based ink compositions, particularly useful dispersants include anionic, cationic or nonionic surfactants such as sodium dodecylsulfate, or potassium or sodium oleylmethyltaurate as described in, for example, U.S. Pat. Nos. 5,679,138; 5,651,813; or 5,985,017.

Self-dispersing pigments that are dispersible without the use of a dispersant or surfactant can be used in the invention. Pigments of this type are those that have been subjected to a surface treatment such as oxidation/reduction, acid/base treatment, or functionalization through coupling chemistry. The surface treatment can render the surface of the pigment with anionic, cationic or non-ionic groups such that a separate dispersant is not necessary. The preparation and use of covalently functionalized self-dispersed pigments suitable for inkjet printing are reported by Bergemann et al. in U.S. Pat. Nos. 6,758,891 and 6,660,075; Belmont in U.S. Pat. No. 5,554,739; Adams and Belmont in U.S. Pat. No. 5,707,432; Johnson and Belmont in U.S. Pat. Nos. 5,803,959 and 5,922, 118; Johnson et al. in U.S. Pat. No. 5,837,045; Yu et al. in U.S. Pat. No. 6,494,943; and in WO/PCT Published Applications: WO 96/18695, WO 96/18696, WO 96/18689, WO 99/51690, WO 00/05313, and WO 01/51566; Osumi et al. in U.S. Pat. Nos. 6,280,513 and 6,506,239; Karl et al. in U.S. Pat. No. 6,503,311; Yeh et al. in U.S. Pat. No. 6,852,156; Ito et al. in U.S. Pat. No. 6,488,753; and Momose et al. in European Patent No. 1,479,732 A1. Examples of commercially available self-dispersing type pigments include Cab-O-Jet 200®, Cab-O-Jet-250®, Cab-O-Jet-260®, Cab-O-Jet-270®, and Cab-O-Jet 300® (Cabot Specialty Chemicals, Inc.); and Bonjet CW-1® and CW-2® (Orient Chemical Industries, Ltd.).

Encapsulating type polymeric dispersants and polymeric dispersed pigments thereof can also be used in the invention. Specific examples are described in U.S. Pat. Nos. 6,723,785 and 6,852,777; U.S. Publication Numbers: 2004/0132942; 2005/0020731; 2005/00951; 2005/0075416; 2005/0124726; 2004/007749; and 2005/0124728. Encapsulating type polymeric dispersants can be especially useful because of their high dispersion stability on keeping and low degree of interaction with ink components.

Composite colorant particles having a colorant phase and a polymer phase are also useful in aqueous pigment-based inks of the invention. Composite colorant particles are formed by polymerizing monomers in the presence of pigments; see for example, U.S. patent application Ser. Nos. 10/446,013; 10/446,059; or 10/665,960. Microencapsulated-type pigment particles are also useful and consist of pigment particles coated with a resin film; see for example U.S. Pat. No. 6,074, 467.

The inks can further contain dyes. Dyes suitable for use in the invention include, but are not limited to, those commonly used in the art of inkjet printing. For aqueous-based ink compositions, such dyes include water-soluble reactive dyes, direct dyes, anionic dyes, cationic dyes, acid dyes, food dyes, metal-complex dyes, phthalocyanine dyes, anthraquinone dyes, anthrapyridone dyes, azo dyes, rhodamine dyes, solvent dyes and the like. Specific examples of dyes usable in the present invention include but are not limited to: Acid Yellows, Reactive Yellows, Food Yellows, Acid Reds, Direct Reds, Reactive Reds, Food Reds, Acid Blues, Direct Blues, Reactive Blues, Food Blues, Acid Blacks, Direct Blacks, Reactive Blacks, Food Black, CAS No. 224628-70-0 sold as JPD Magenta EK-1 Liquid from Nippon Kayaku Kabushiki Kaisha; CAS No. 153204-88-7 sold as Intrajet® Magenta KRP from Crompton and Knowles Colors; and the metal azo dyes disclosed in U.S. Pat. Nos. 5,997,622 and 6,001,161.

Also useful in the invention are polymeric dyes or loaded-dye/latex particles. Examples of polymeric dyes are described in U.S. Pat. No. 6,457,822 and references therein. Examples of loaded-dye/latex particles are described in U.S. Pat. No. 6,431,700 and U.S. patent application Ser. Nos. 10/393,235; 10/393,061; 10/264,740; 10/020,694; and 10/017,729.

The supplemental colorants used in the ink composition of the invention can be present in any effective amount, generally from 0.1% to 10% by weight, and preferably from 0.5% to 6% by weight.

The inkjet inks of the invention include from 0.1% to 4% by weight of Compound I represented by the following Structure (I):

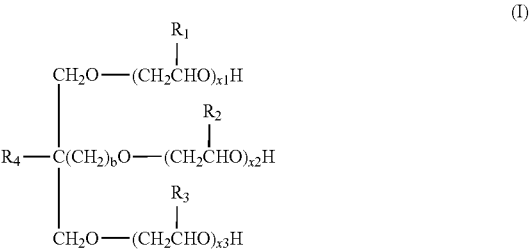

wherein $R_4$ is chosen from the group consisting of —H, —CH$_3$, —C$_2$H$_5$, —C$_3$H$_7$, and —CH$_2$O(CH$_2$CHR$_5$O)$_{x4}$H; when $R_4$ is —H, —CH$_3$, —C$_2$H$_5$, or —C$_3$H$_7$, each of $R_1$, $R_2$ and $R_3$ are independently hydrogen or methyl; b is 0 or 1; $x_1$, $x_2$ and $x_3$ are each equal to at least 1, and the sum of $x_1$, $x_2$ and $x_3$ is 3 to 21, and when $R_4$ is —$CH_2O(CH_2CHR_5O)_{x4}H$, each of $R_1$, $R_2$, $R_3$ and $R_5$ is independently hydrogen or methyl; b is 0 or 1 and the sum $x_1$, $x_2$, $x_3$, and $x_4$ is from 3 to 28; In one mode, Compound I comprises four hydroxyl groups. In another mode, $R_4$ is —$CH_2O(CH_2CHR_5O)_{x4}H$ and $R_5$ is hydrogen or methyl. In a suitable ink, Compound I is present at from 1 to 3% by weight. In another embodiment, Compound I according to the structure comprises three hydroxyl groups and three polyoxyethylene or polyoxypropylene moiety containing branches. In any event, Compound I can have either polyoxyethylene or polyoxypropylene moiety containing branches or mixtures of both polyoxyethylene and polyoxypropylene moiety containing branches.

Specific embodiments of compounds according to Structure I include, but are not limited to, the glycerol ethoxides, glycerol propoxides, glyceryths, pentaerythritol ethoxides, and pentaerythritol propoxides.

Inks of the invention comprise from 0.05% to 3% by weight of a water soluble polyurethane latex binder. The polyurethane latex binder is conveniently present at from 0.1% to 2% by weight, and desirably present at from 0.2% to 1% by weight.

The polyurethane latex binder is formed from at least one monomer comprising at least two hydroxyl groups and at least one carboxyl group and another monomer comprising at least two isocyanate groups. While diisocyanates are typically used in the art of polyurethane chemistry, triisocyanates can also be used. Examples of diisocyanates include isophorone diisocyanate, hexamethylene diisocyanate, toluene diisocyanate, tetramethylene diisocyanate, diphenylmethylene diisocyanate, and other diisocyanates as known in the polymer arts. The polyurethanes used in the invention are optionally derived from an additional monomer comprising at least two hydroxyl groups and which is different from the monomer having at least two hydroxyl groups. These optional monomers are typically higher molecular weight monomers having a molecular weight of less than 3000. They are often referred to in the art as polyols. Examples include polyols and polyhydroxy derivatives of polycarbonates, polyethers, polyesters, polyacetals, polyacrylates, polyester amides and polythioethers. Preferably the optional monomer is a polycarbonate. More preferably, the optional monomer comprising at least two hydroxyl groups is a poly (hexamethylene carbonate) diol. Examples of monomers comprising at least two hydroxyl groups and at least one carboxylic acid group are 2,2-bis(hydroxymethyl)propionic acid and the hydroxyethylether of 4,4-bis(4-hydroxyphenyl)-valeric acid. Other examples are described in U.S. Pat. No. 6,268,101 and U.S. Publication No. 2003/0184629 and references cited therein. Water-dispersible polyurethanes are disclosed as binders in pigmented inks in U.S. Pat. No. 6,533,408, and particularly useful polyurethanes for pigmented inkjet inks which exhibit good jetting performance and good resulting image durability are described in U.S. Publication No. 2004/0085419.

The polyurethane used in the invention has a weight average molecular weight, Mw, of greater than 7,500. If Mw is less than 7,500, then the inkjet ink composition may not provide adequate stain and scratch resistance. A Mw of greater than 10,000 is typically preferred. The maximum Mw of the polyurethane is not particularly limited, but is generally dictated by the physical property requirements of the composition and the method by which it will be applied, as discussed below. If the ink composition is used as an inkjet ink for a thermal printhead, then the maximum Mw of the polyurethane is suitably 30,000. The acid number of the polyurethane is provided by acid groups that are, in turn, provided by the at least one monomer comprising at least two hydroxyl groups. The acid groups are preferably carboxylic acid groups, but any type of acid groups can be used. The polyurethane latex binder can have an acid number from 50 to 200 and desirably has an acid number from 60 to 150 and typically from 70 to 90. The polyurethane used in the invention can exhibit a Tg of from 20 to 180° C., typically from 40 to 120° C., and more suitably from 60 to 100° C.

Inks of the invention can optionally include up to 3% by weight of a water soluble polyacrylate polymer. The water soluble polyacrylate polymers can be either addition polymers or condensation polymers, both of which are well known to those skilled in the art of polymer chemistry. Specific examples include, but are not limited to: acrylic acid polymer; methacrylic acid polymer; styrene-acrylic acid copolymer, styrene-acrylic acid-acrylic acid alkyl ester copolymer, styrene-maleic acid copolymer, styrene-maleic acid-acrylic acid alkyl ester copolymer, styrene-methacrylic acid copolymer, styrene-methacrylic acid-acrylic acid alkyl ester copolymer, styrene-maleic acid hemi ester copolymer, vinyl naphthalene-acrylic acid copolymer, vinyl naphthalene-maleic acid copolymer and so forth. Especially preferred water soluble polyacrylate polymers include benzyl-methacrylate-acrylic acid copolymers and styrene-maleic acid hemi ester copolymers. These polymers are rendered water soluble by the presence of the acid group originating in the acrylic acid, maleic acid or methacrylic acid moiety of the polymer. For polymers including acid groups, the extent of polymer charge stabilization is quantified as the polymer acid number (AN). A calculated polymer acid number is defined as the number of moles of acid monomer per gram of polymer times 56 (which is the molecular weight of potassium hydroxide). A measured acid number is the number of moles of acid found per gram of polymer times 56, when titrating with potassium hydroxide in water. The water soluble polyacrylate polymer suitably exhibits an acid number from 100 to 400 and usually from 120 to 300 and a weight average molecular weight Mw from 5,000 to 20,000 and more typically from 6,000 to 16,000.

The inks useful in the invention are subject to the proviso that the weight ratio of dispersed pigment to the sum of water soluble polyacrylate polymer (if any) and polyurethane latex binder is from 3:1 to 1:2. More usefully, the weight ratio of dispersed pigment to the sum of water soluble polyacrylate polymer and polyurethane latex binder is from 2:1 to 1:2. Most typically, the weight ratio of dispersed pigment to the sum of water soluble polyacrylate polymer and polyurethane latex binder is from 2:1 to 1:1. Lower quantities of polymer can cause poor jetting or poor film formation while higher quantities of polymer can cause poor jetting, clogging of ejectors or printer maintenance stations and ink coalescence on many printing media.

Additional polymers can be present in the inkjet inks of the invention. The polymers can act as binders or jetting-aids. These polymers can be classified as water-soluble polymers, water-reducible polymers or water-dispersible polymeric particles.

By the term "water-soluble" is meant that the polymer is dissolved in water such that scattering is not observed when a dilute solution of the polymer is analyzed using dynamic light scattering or any other technique well known in the art of particle analysis.

By the term "water-reducible" is meant that the polymer can be diluted with water to form reasonably stable dispersions of polymer aggregates swollen by solvent and water, as described in "Organic Coatings: Science and Technology" (2nd Edition by Wicks, Jones and Papas, published by Wiley- Interscience, 1999). Such polymers have hydrophilic groups in some monomers, but are not water soluble until neutralized by base.

By the term "water-dispersible" is meant that the polymer exists in the form of discrete particles in water, the particles being dispersed or suspended and often stabilized against flocculation and settling by the use of dispersing agents. In contrast to a water-soluble polymer, a dilute solution of a water-dispersible polymer exhibits scattering when analyzed using dynamic light scattering or any other technique well known in the art of particle analysis.

The water soluble polymers useful in the ink compositions include nonionic, anionic, amphoteric and cationic polymers. Representative examples of water soluble polymers include, polyvinyl alcohols, polyvinyl acetates, polyvinyl pyrrolidones, carboxymethyl cellulose, polyethyloxazolines, polyamides and alkali soluble resins, polyuretbanes (such as those found in U.S. Pat. No. 6,268,101), polyacrylic acids, styrene-acrylic methacrylic acid copolymers (such as Joncryl® 70 from S.C. Johnson Co.; TruDot® U-4655 from MeadWestvaco Corp.; and Vancryle® 68S from Air Products and Chemicals, Inc.; and polymers exemplified in U.S. Pat. No. 6,866,379 and U.S. Publication No. 2005/0134665.

The water-dispersible polymer particles are generally classified as either addition polymers or condensation polymers, both of which are well known to those skilled in the art of polymer chemistry. Examples of water-dispersible polymer particle classes include acrylics, styrenics, polyethylenes, polypropylenes, polyesters, polyamides, polyurethanes, polyureas, polyethers, polycarbonates, polyacid anhydrides, and copolymers consisting of combinations thereof. Such polymer particles can be ionomeric; film forming, non-film-forming, fusible, or heavily cross-linked and can have a wide range of molecular weights and glass transition temperatures.

Examples of water dispersible polymeric particles used in inkjet inks are styrene-acrylic copolymers sold under the trade names Joncryl® (S. C. Johnson Co.), Ucar™ (Dow Chemical Co.), Jonrez® (MeadWestvaco Corp.), and Vancryl® (Air Products and Chemicals, Inc.); sulfonated polyesters sold under the trade name Eastman AQ® (Eastman Chemical Co.); polyethylene or polypropylene resin emulsions and polyurethanes (such as the Witcobonds® from Witco Corp.). Core-shell polymer particles have also been employed inkjet inks for water-fastness and rub-resistance improvements (U.S. Pat. Nos. 5,814,685; 5,912,280; 6,057, 384; 6,271,285; and 6,858,301). Additional examples of water dispersible polymer particles include the thermoplastic resin particles as disclosed in U.S. Pat. Nos. 6,147,139 and 6,508,548. The polymer particles can be a mixture of high and low glass transition temperature polymers such as those disclosed in U.S. Pat. No. 6,498,202. Additionally, core-shell polymer particles as described in U.S. Pat. Nos. 5,814,685; 5,912,280; 6,057,384; 6,271,285; and 6,858,301 can be employed. It is also possible to include in the ink, in addition to the durability enhancing polymer particles, heavily cross-linked polymer particles.

Ink compositions useful in the invention include one or more water-soluble humectants, also called co-solvents, in order to provide useful properties to the inkjet ink. Typical useful properties include but are not limited to: preventing the ink composition from drying out or crusting in the nozzles of the printhead, aiding solubility of the components in the ink composition, aiding firing properties of the ink from an ejector, facilitating penetration of the ink composition into the image-recording element after printing, aiding gloss, suppressing intercolor bleed, suppressing coalescence, and suppressing mechanical artifacts such as paper cockle and curl during and after printing. Any water-soluble humectant known in the ink-jet art can be employed. By water-soluble is meant that a mixture of the employed humectant(s) and water is homogeneous. While an individual humectant can be employed, useful inkjet inks can employ mixtures of two, three or more humectants, each of which imparts a useful property to the inkjet ink. Representative examples of humectants and co-solvents used in aqueous-based ink compositions include (1) alcohols, such as methyl alcohol, ethyl alcohol, n-propyl alcohol, isopropyl alcohol, n-butyl alcohol, sec-butyl alcohol, t-butyl alcohol, iso-butyl alcohol, firfuryl alcohol, and tetrahydrofurfuryl alcohol; (2) polyhydric alcohols, such as ethylene glycol, diethylene glycol, triethylene glycol, tetraethylene glycol, propylene glycol, dipropyleneglycol, the polyethylene glycols, the polypropylene glycols, 1,2-propanediol, 1,3-propanediol, 1,2-butanediol, 1,3-butanediol, 1,4-butanediol, 1,2,4-butanetriol, 3-methyl-1,3-butanediol, 2-methyl-1,3-propanediol, 1,5-pentanediol, 1,6-hexanediol, 2-methyl-2,4-pentanediol, 1,7-hepanediol, 2-ethyl-1,3-hexane diol, 2,2,4-trimethyl-1,3-pentane diol, 1,8-octane diol, glycerol, 1,2,6-hexanetriol, 2-ethyl-2-hydroxymethyl-propanediol, 2-methyl-2-hydroxymethyl-propanediol, saccharides and sugar alcohols and thioglycol; (3) polyoxygenated polyols and their derivatives such as diglycerol, polyglycerols, and the alkylated and acetylated derivatives of glyceryths, pentaerythritol ethoxides, and pentaerythritol propoxides; (4) nitrogen-containing compounds such as urea, 2-pyrrolidone, N-methyl-2-pyrrolidone, imidazolidinone, N-hydroxyethyl acetamide, N-hydroxyethyl 2-pyrrolidinone, 1-(hydroxyethyl)-1,3-imidazolidinone and 1,3-dimethyl-2-imidazolidinone; and (5) sulfur-containing compounds such as 2,2'-thiodiethanol, dimethyl sulfoxide and tetramethylene sulfone. Of these, glycerol and the polyhydric alcohol derivatives thereof are preferred and glycerol is especially preferred. The polyhydric alcohol derivatives of glycerol include the glycerol ethoxides, glycerol propoxides and glyceryths. The humectants can be employed alone or in combination with one or more additional listed humectants. When glycerol and the polyhydric alcohol derivatives thereof are employed, they can be employed at from 1 to 20% by weight, typically from 2 to 15% by weight and suitably from 3 to 10% by weight. While any quantity of water soluble humectants singly or in combination can be employed, the total quantity of water soluble humectant is typically from 3 to 45 percent by weight and typically from 8 to 35 percent by weight. Typical aqueous-based ink compositions useful in the invention can contain, for example, the following components based on the total weight of the ink: water 50-95%, and humectant(s) 3-45%.

The pH of the aqueous ink compositions of the invention can be adjusted by the addition of organic or inorganic acids or bases. Useful inks can usually have a pH of from 2 to 10, depending upon the type of dye or pigment being used and depending on the charge characteristics of the other ink components employed. Anionic charge stabilized anti-abrasion polymers are employed in inks having a pH of above 6, with suitable pH ranges of from 7 to 11 and a typical pH range of from 7.5 to 10. Typical inorganic acids include nitric, hydrochloric, phosphoric and sulfuric acids. Typical organic acids include methanesulfonic, acetic, formic and lactic acids. Typical inorganic bases include alkali metal hydroxides and carbonates including but not limited to sodium hydroxide and potassium hydroxide.

Surprisingly, the well-known amine bases often used as pH adjustment agents and buffers can cause marked degradation in the fireability and stability of the ink of the invention. Accordingly, the ink of the invention is free of an ejection disabling quantity of a water soluble amine. By free of a water soluble amine, is meant that the ink does not include a firing compromising quantity of a water soluble amine. A firing compromising quantity of water soluble amine is that quantity of water soluble amine that causes a decrease in firing velocity of more than 15% or an increase in ink TTrms of greater that 95% relative to the firing characteristics of the same ink that does not contain the water soluble amine. Inks can be evaluated for jetting performance in a thermal inkjet print head as follows: Ink is supplied to a thermal print head with 6 pL nozzles. The jetting velocity and the transit time for each drop to travel 0.3 mm from the nozzle plate is measured for 250 drops at each of a set of varying firing frequencies from 280 to 27,720 Hz at an operating voltage of 12% above the threshold voltage required for firing the inks. The 0.3 mm distance is typical of the distance between the ejector and the receiving paper surface in a typical inkjet printer. The average velocity and the root mean square variation (rms) of the transit times (TTrms) are calculated for 3 sets of firings of 10 different nozzles fired at identical conditions (30 firing sets total). In a practical sense, this means that the ink should comprise less than 0.05% by weight, preferably less than 0.03% by weight and more preferably less than 0.01% by weight of the water soluble amine, or is free of water-soluble amines. Typical water soluble amines include but are not limited to ammonia, ethanolamine, triethanolamine, dimethylethanolamine, N-methylmorpholine and so forth. Distinct water soluble amines can cause different degrees of ink firing degradation.

Inkjet ink compositions can also contain non-colored particles such as inorganic particles or polymeric particles. The use of such particulate addenda has increased over the past several years, especially in inkjet ink compositions intended for photographic-quality imaging. For example, U.S. Pat. No. 5,925,178 describes the use of inorganic particles in pigment-based inks in order to improve optical density and rub resistance of the pigment particles on the image-recording element. In another example, U.S. Pat. No. 6,508,548 describes the use of a water-dispersible polymer in dye-based inks in order to improve light and ozone resistance of the printed images. For use of such particles to improve gloss differential, light and/or ozone resistance, waterfastness, rub resistance and various other properties of a printed image; see for example, U.S. Pat. No. 6,598,967. Colorless ink compositions that contain non-colored particles and no colorant can also be used. Colorless ink compositions are often used in the art as "fixers" or insolubilizing fluids that are printed under, over, or with colored ink compositions in order to reduce bleed between colors and waterfastness on plain paper; see for example, U.S. Pat. No. 5,866,638 or U.S. Pat. No. 6,450,632. Colorless inks are also used to provide an overcoat to a printed image, usually in order to improve scratch resistance and waterfastness; see for example, U.S. Publication No. 2003/0009547 A1 or European Patent No. 1,022,151 A1. Colorless inks are also used to reduce gloss differential in a printed image; see for example: U.S. Pat. No. 6,604,819; and U.S. Publication Numbers 2003/0085974; 2003/0193553; or 2003/0189626.

Examples of inorganic particles useful in the invention include, but are not limited to, alumina, boehmite, clay, calcium carbonate, titanium dioxide, calcined clay, aluminosilicates, silica, or barium sulfate.

Surfactants can be added to adjust the surface tension of the ink to an appropriate level. The surfactants can be anionic, cationic, amphoteric or nonionic and used at levels of 0.01 to 5% of the ink composition. Examples of suitable nonionic surfactants include, linear or secondary alcohol ethoxylates (such as the Tergitol® 15-S and Tergitol® TMN series available from Union Carbide and the Brij® series from Uniquema), ethoxylated alkyl phenols (such as the Triton® series from Union Carbide), fluoro surfactants (such as the Zonyls® from DuPont; and the Fluorads® from 3M), fatty acid ethoxylates, fatty amide ethoxylates, ethoxylated and propoxylated block copolymers (such as the Pluronic® and Tetronic® series from BASF, ethoxylated and propoxylated silicone based surfactants (such as the Silwet® series from CK Witco), alkyl polyglycosides (such as the Glucopons® from Cognis) and acetylenic polyethylene oxide surfactants (such as the Surfynols from Air Products). Additionally any conformationally asymmetric water-soluble polyoxygenated hydrocarbons enabling surface tension reduction can be employed as a surfactant. Dynamic surface tension reducing agents as known in the art can also be employed. Examples include the known lower mono-alkyl ethers derived from the polyhydric alcohols; glycol specific examples include but are not limited to ethylene glycol monomethyl ether, ethylene glycol monobutyl ether, ethylene glycol monoethyl ether acetate, diethylene glycol monomethyl ether, diethylene glycol monobutyl ether, polyethylene monobutyl ether, propylene glycol monopropyl ether and diethylene glycol monobutyl ether acetate, among others all as supplied as the Dowanol®, Cellusolve®, and Carbitol® series from Dow Chemical. Additional examples include the surface active lower alcohols; specific examples include but are not limited to: 1,2-butanediol, 1,2-pentanediol, 1,2-hexanediol, 1-phenyl-1,2-ethanediol, 1,2-heptanediol, 1,2-octanediol, 1,3,6-hexanediol, 1,6-hexanediol and 1,3-hexanediol.

Examples of anionic surfactants include; carboxylated (such as ether carboxylates and sulfosuccinates), sulfated (such as sodium dodecyl sulfate), sulfonated (such as dodecyl benzene sulfonate, alpha olefin sulfonates, alkyl diphenyl oxide disulfonates, fatty acid taurates and alkyl naphthalene sulfonates), phosphated (such as phosphated esters of alkyl and aryl alcohols, including the Strodex® series from Dexter Chemical), phosphonated and amine oxide surfactants and anionic fluorinated surfactants. Examples of amphoteric surfactants include betaines, sultaines, and aminopropionates. Examples of cationic surfactants include; quaternary ammonium compounds, cationic amine oxides, ethoxylated fatty amines and imidazoline surfactants. Additional examples of the above surfactant classes are described in "McCutcheon's Emulsifiers and Detergents: 1995, North American Editor".

A biocide can be added to an inkjet ink composition to suppress the growth of microorganisms such as molds, fungi, etc. in aqueous inks. A preferred biocide for an ink composition is Proxel® GXL (Zeneca Specialties Co.) at a final concentration of 0.0001-0.5 wt. % or Kordek®. Additional additives which can optionally be present in an inkjet ink composition include thickeners, conductivity enhancing agents, anti-kogation agents, drying agents, waterfast agents, dye solubilizers, chelating agents, binders, light stabilizers, viscosifiers, buffering agents, anti-mold agents, anti-curl agents, stabilizers and defoamers.

The exact choice of ink components will depend upon the specific application and performance requirements of the printhead from which they are jetted. Thermal and piezoelectric printheads which can function either in drop-on-demand ink ejection mode or continuous ink ejection mode each require ink compositions with a different set of physical properties in order to achieve reliable and accurate jetting of the ink, as is well known in the art of inkjet printing. Acceptable viscosities are no greater than 20 cP, and preferably in the range of about 1.0 to 6.0 cP and more preferably in the range of 1.5 to 4 cP. Acceptable static surface tensions are no greater than 60 dynes/cm, and preferably in the range of 28 dynes/cm to 45 dynes/cm.

The inks are preferentially applied to a paper by thermal or piezo ejection. Preferentially, an inkjet printhead capable of achieving firing frequencies of at least 12 kHz with a near nozzle velocity of at least 10 meters/second is employed. Any of the known printhead designs in the art of inkjet printing can be used provided they can achieve these high speed firing frequencies. Preferably, the IJ printer is equipped with a thermal inkjet printhead. Particularly preferred printhead designs are disclosed in U.S. Publication Number 2006/0103691 and unpublished copending application U.S. patent application Ser. No. 11/609,365; filed 12 Dec. 2006.

The inks of the invention can be used alone or they can be used in combination. When used alone, the ink can be employed in a monochrome printer. When used in combination, the inks can be of similar color as in a monochrome printer or of distinct color as in a full color printer. When used in combination, two inks of similar color but distinct composition, such as a light ink and a dark ink can be used to form a finely graduated or continuous photo-tone image. Alternatively, distinct colored inks can be combined to form an inkjet ink set. When inks according to the invention are used in combination, they are preferably applied in an overlapping mode to a common area of the paper or in non-overlapping mode to adjacent areas of the paper, all as known in the inkjet ink application art. A color ink set preferably has at least cyan, magenta, and yellow colored inks with optimal additions of black ink(s), such as Photo-black inks and text black inks, clear inks to act as gloss aids and protective overcoats and optional red, green, blue, brown, orange, violet, photo-cyan and photo-magenta inks, and so forth to aid in pictorial reproduction, all as known in the inkjet art. A color ink set can contain both distinct colored inks and similarly colored inks of distinct composition. The inkjet ink set according to the invention can comprise the inventive ink alone or in several inks of the inkjet ink set.

The inkjet inks, inkjet ink-sets and image forming methods described above can be usefully employed with any suitable inkjet image receiver known in the art. This includes, but is not limited to both matte and glossy forms of plain papers, cardstocks, cardboards, transparent or opaque plastics and vinyls, treated papers, coated papers and multilayer image receivers. The glossy receivers are especially preferred as imaging media for use with the inventive inkjet inks, inkjet ink-sets, and inkjet image forming methods.

The inkjet inks of the invention can be packaged in an art known inkjet ink container suitable for supplying ink to an ink ejector. The container can have one or more ink reservoirs each holding a distinct inventive ink. In one embodiment, intended for desktop applications, the reservoirs can individually hold up to about 20 ml of ink. In embodiments intended for commercial applications, the reservoirs can individually hold up to about 5 liters of ink.

EXAMPLES

Acrylic Polymeric AP-1: A copolymer of benzylmethacrylate and methacrylic acid having an acid number of about 135 as determined by titration method, a weight average molecular weight of about 7,160 and number average molecular weight of 4,320 as determined by the Size Exclusion Chromatography. The polymer is neutralized with potassium hydroxide to have a degree of neutralization of about 85%.

Acrylic Polymeric AP-2: SMA17352®, a styrene maleic anhydride copolymer commercially available from SARTOMER COMPANY INC. and having an acid number of about 270. The polymer is neutralized with potassium hydroxide to have a degree of neutralization of about 85%.

Polyurethane PU-1; A 76 acid number polyurethane with a weight average molecular weight of 13,300 made with isophorone diisocyanate and a combination of poly(hexamethylene carbonate) diol and 2,2-bis(hydroxymethyl)propionic acid where 100% of the acid groups are neutralized with potassium hydroxide.

Preparation of Pigment Dispersions Used to Prepare Pigment Inks Cyan Pigment Dispersion CD-1

A mixture of polymeric beads (milling media), CI Pigment Blue 15:3 (Sun Chemical Corp.), and an aqueous solution of potassium oleylmethyltaurate was prepared and diluted with distilled water. The mixture was milled for 24 hours and the milling media was separated from the pigment dispersion. The resulting pigment dispersion was then filtered through a one-micrometer binder-free glass fiber filter (Pall Corp.) to obtain the final pigment dispersion having approximately 10% of pigment and 2.5% dispersant. The resulting dispersion of cyan pigment particles was measured for particle size using a Nanotrac® NAS 35 instrument from Microtrac Incorporated and had a median particle size diameter of 0.05 microns.

Magenta Pigment Dispersion MD-1

A mixture of polymeric beads (milling media), CI Pigment Red 122 (Sun Chemical Corp.), and an aqueous solution of potassium oleylmethyltaurate was prepared and diluted with distilled water. The mixture was milled for 24 hours and the milling media was separated from the pigment dispersion. The resulting pigment dispersion was then filtered through a one-micrometer binder-free glass fiber filter (Pall Corp.) to obtain the final pigment dispersion having approximately 10% of pigment and 3% dispersant. The resulting dispersion of cyan pigment particles was measured for particle size using a Nanotrac® NAS 35 instrument from Microtrac Incorporated and had a median particle size diameter of 0.015 microns.

Carbon Black Pigment Dispersion CB-1

A mixture of polymeric beads (milling media), carbon black pigment (Black Pearls® 880, Cabot Corporation), and an aqueous solution of potassium oleylmethyltaurate was prepared and diluted with distilled water. The mixture was milled for 24 hours and the milling media was separated from the pigment dispersion. The resulting pigment dispersion was then filtered through a one-micrometer binder-free glass fiber filter (Pall Corp.) to obtain the final pigment dispersion having approximately 10% of pigment and 3% dispersant. The resulting dispersion of carbon black pigment particles was measured for particle size using a Nanotrac® NAS 35 instrument from Microtrac Incorporated and had a median particle size diameter of 0.074 microns.

Preparation of Inks

A series of cyan pigment inks were prepared according to the formulations provided in Table 1 using cyan pigment dispersion CD-1 as the source of pigment particles.

TABLE 1

Cyan Pigment Ink Formulations (weight percent active component)

| Ink Component(s) | Cyan 1 | Cyan 2 | Cyan 3 | Cyan 4 | Cyan 5 |
|---|---|---|---|---|---|
| Cyan pigment CD-1 | 0.44 | 0.44 | 0.44 | 0.44 | 0.44 |
| Strodex ® PK-90 | 0.25 | 0.20 | | | |
| Surfynol ® 465 | | | 0.85 | 0.85 | 0.85 |
| Glycerol | 7.5 | 7.5 | 7.5 | 7.5 | 7.5 |
| Ethylene glycol | 4.5 | 4.5 | 4.5 | 4.5 | 4.5 |
| 1,5-pentanediol | | | 2.0 | 2.0 | 2.0 |

TABLE 1-continued

Cyan Pigment Ink Formulations (weight percent active component)

| Ink Component(s) | Cyan 1 | Cyan 2 | Cyan 3 | Cyan 4 | Cyan 5 |
|---|---|---|---|---|---|
| Pentaerythritol ethoxylate 15/4 | | 2.5 | | 1.0 | 2.0 |
| Acrylic Polymer AP-1 | 0.18 | 0.18 | | | |
| Acrylic Polymer AP-2 | | | 0.18 | 0.18 | 0.18 |
| Polyurethane PU-1 | 0.24 | 0.24 | 0.24 | 0.24 | 0.24 |
| Kordek ® MLX | 0.02 | 0.02 | 0.03 | 0.03 | 0.03 |
| Deionized water | 86.76 | 84.31 | 84.16 | 83.16 | 83.16 |

A series of magenta pigment inks were prepared according to the formulations provided in table 2 using magenta pigment dispersion MD-1 as the source of pigment particles.

TABLE 2

Magenta Pigment Ink Formulations (weight percent active component)

| Ink Components(s) | Magenta 1 | Magenta 2 | Magenta 3 |
|---|---|---|---|
| Magenta pigment MD-1 | 1.0 | 1.0 | 1.0 |
| Surfynol ® 465 | 0.5 | 0.5 | 0.5 |
| Glycerol | 8.0 | 8.0 | 8.0 |
| Ethylene glycol | 5.0 | 5.0 | 5.0 |
| Pentaerythritol ethoxylate 15/4 | | 2.0 | 4.0 |
| Acrylic Polymer AP-1 | 0.2 | 0.2 | 0.2 |
| Polyurethane PU-1 | 0.3 | 0.3 | 0.3 |
| Kordek ® MLX | 0.02 | 0.02 | 0.02 |
| Deionized water | 84.68 | 82.68 | 80.68 |

A series of black pigment inks were prepared according to the formulations provided in tables 3, 4 and 5 using pigment dispersion CB-1, magenta pigment dispersion MD-1 and cyan pigment dispersion CD-1 as the source of pigment particles.

TABLE 3

Black Pigment Ink Formulations (weight percent active component)

| Ink Component(s) | Black 1 | Black 2 | Black 3 | Black 4 |
|---|---|---|---|---|
| Carbon black pigment CB-1 | 0.39 | 0.39 | 0.39 | 0.39 |
| Cyan pigment | 0.09 | 0.09 | 0.09 | 0.09 |
| Magenta pigment | 0.12 | 0.12 | 0.12 | 0.12 |
| Strodex ® PK-90 | 0.25 | 0.25 | 0.25 | 0.25 |
| Glycerol | 8.0 | 8.0 | 8.0 | 8.0 |
| Ethylene glycol | 4.0 | 4.0 | 4.0 | 4.0 |
| Pentaerythritol propoxylate 5/4 | | 1.0 | 1.5 | 2.0 |
| Polyurethane PU-1 | 0.3 | 0.3 | 0.3 | 0.3 |
| Kordek ® MLX | 0.02 | 0.02 | 0.02 | 0.02 |
| Deionized water | 86.67 | 85.67 | 85.17 | 84.67 |

TABLE 4

Black Pigment Ink Formulations (weight percent active component)

| Ink Component | Black 5 | Black 6 | Black 7 | Black 8 |
|---|---|---|---|---|
| Carbon black pigment CB-1 | 0.39 | 0.39 | 0.39 | 0.39 |
| Cyan pigment | 0.09 | 0.09 | 0.09 | 0.09 |
| Magenta pigment | 0.12 | 0.12 | 0.12 | 0.12 |
| Strodex ® PK-90 | 0.25 | 0.25 | 0.25 | 0.25 |
| Glycerol | 8.0 | 8.0 | 8.0 | 8.0 |
| Ethylene glycol | 4.0 | 4.0 | 4.0 | 4.0 |
| Pentaerythritol propoxylate 5/4 | | 1.0 | 1.5 | 2.0 |
| Polyurethane PU-1 | 0.2 | 0.2 | 0.2 | 0.2 |
| Acrylic Polymer AP-1 | 0.1 | 0.1 | 0.1 | 0.1 |
| Kordek ® MLX | 0.02 | 0.02 | 0.02 | 0.02 |
| Deionized water | 86.67 | 85.67 | 85.17 | 84.67 |

TABLE 5

Black Pigment Ink Formulations (weight percent active component)

| Ink Component | Black 9 | Black 10 | Black 11 | Black 12 |
|---|---|---|---|---|
| Carbon black pigment CB-1 | 0.39 | 0.39 | 0.39 | 0.39 |
| Cyan pigment | 0.09 | 0.09 | 0.09 | 0.09 |
| Magenta pigment | 0.12 | 0.12 | 0.12 | 0.12 |
| Strodex ® PK-90 | 0.25 | 0.25 | 0.25 | 0.25 |
| Glycerol | 8.0 | 8.0 | 8.0 | 8.0 |
| Ethylene glycol | 4.0 | 4.0 | 4.0 | 4.0 |
| Pentaerythritol propoxylate 5/4 | 2.0 | | 2.0 | |
| Polyurethane PU-1 | 0.2 | 0.2 | 0.3 | 0.3 |
| Acrylic Polymer AP-2 | 0.1 | 0.1 | 0.1 | 0.1 |
| Kordek ® MLX | 0.02 | 0.02 | 0.02 | 0.02 |
| Deionized water | 84.67 | 86.67 | 84.67 | 86.67 |

Evaluation of Jetting Performance in a Thermal Inkjet Print Head.

Inks were evaluated for jetting performance in a thermal inkjet print head after six to eight weeks keeping under normal storage conditions of room temperature (approximately 20° C.). In addition, selected inks were incubated at elevated temperatures according to the following procedure. A sample of ink was placed in a high-density polyethylene bottle with a sealed cap and placed in an oven at 60° C. for 6-8 weeks. The inks were removed from the oven and allowed to cool to room temperature. The jetting properties were then measured as described below.

Each ink was supplied to a thermal print head with 6 pL nozzles. The jetting velocity and the transit time for each drop to travel 0.3 mm from the nozzle plate was measured for 250 drops at each of a set of varying firing frequencies from 280 to 27,720 Hz at an operating voltage of 12% above the threshold voltage required for firing the inks. The 0.3 mm distance is typical of the distance between the ejector and the receiving paper surface in a typical inkjet printer. The average velocity and the root mean square variation (rms) of the transit times (TTrms) were calculated for 3 sets of firings of 10 different nozzles fired at identical conditions (30 firing sets total)

TABLE 6

Jetting Performance of Black Pigmented Inks at 12,000 Hz

| Ink Identification | Age of Ink | Incubation | Average Velocity | TTrms |
|---|---|---|---|---|
| Black 1 (comparison) | Fresh | — | 15.6 | 1.8 |
| Black 2 (invention) | Fresh | — | 15.1 | 0.8 |
| Black 3 (invention) | Fresh | — | 15.1 | 0.5 |
| Black 4 (invention) | Fresh | — | 17.0 | 0.3 |
| Black 5 (comparison) | Fresh | — | 13.8 | 2.1 |
| Black 6 (invention) | Fresh | — | 11.4 | 1.8 |
| Black 7 (invention) | Fresh | — | 14.7 | 0.9 |
| Black 8 (invention) | Fresh | — | 16.4 | 0.7 |
| Black 9 (invention) | Fresh | — | 18.4 | 0.5 |
| Black 10 (comparison) | Fresh | — | 16.5 | 1.3 |
| Black 11 (invention) | Fresh | — | 17.4 | 0.2 |
| Black 12 (comparison) | Fresh | — | 16.6 | 1.3 |

TABLE 7

Jetting Performance of Magenta Pigmented Inks at 12,000 Hz

| Ink Identification | Age of Ink | Incubation | Average Velocity | TTrms |
|---|---|---|---|---|
| Magenta 1 (comparison) | 8 weeks | room temp | 12.1 | 0.4 |
| | 8 weeks | 60 deg. C. | 9.7 | 0.9 |

TABLE 7-continued

Jetting Performance of Magenta Pigmented Inks at 12,000 Hz

| Ink Identification | Age of Ink | Incubation | Average Velocity | TTrms |
|---|---|---|---|---|
| Magenta 2 (invention) | 8 weeks | room temp | 14.6 | 0.2 |
|  | 8 weeks | 60 deg. C. | 11.7 | 0.6 |
| Magenta 3 (invention) | 8 weeks | room temp | 16.4 | 0.2 |
|  | 8 weeks | 60 deg. C. | 15.0 | 0.3 |

TABLE 8

Jetting Performance of Cyan Pigment Inks at 12,000 Hz

| Ink Identification | Age of Ink | Incubation | Average Velocity | TTrms |
|---|---|---|---|---|
| Cyan 1 (comparison) | 6 weeks | room temp | 10.4 | 0.5 |
|  | 6 weeks | 60 deg. C. | 7.1 | 1.1 |
| Cyan 2 (invention) | 6 weeks | room temp | 10.7 | 0.5 |
|  | 6 weeks | 60 deg. C. | 10.6 | 0.5 |
| Cyan 3 (comparison) | 6 weeks | room temp | 12.1 | 0.2 |
|  | 6 weeks | 60 deg. C. | 6.8 | 1.0 |
| Cyan 4 (invention) | 6 weeks | room temp | 12.3 | 0.2 |
|  | 6 weeks | 60 deg. C. | 8.7 | 0.6 |
| Cyan 5 (invention) | 6 weeks | room temp | 13.4 | 0.2 |
|  | 6 weeks | 60 deg. C. | 9.5 | 0.4 |

The data presented in Tables 6, 7 and 8 illustrate that the inventive inks exhibit improved ink average velocities and reduced noise, as measured by TTrms, under both mild and harsh condition keeping conditions.

Inks generally like those in the above ink sets were prepared with pigment dispersions that had been ground to distinct particle sizes to form inks 101 through 118. These inks were individually printed onto Kodak Glossy Media and the 20 deg gloss measured using a Glossometer. Higher Gloss readings correspond to a more reflective image reminiscent of traditional photographic images. These results are reported in Table 9 below.

TABLE 9

| Ink Number | Pigment Employed | 50% Percentile Particle Size in Ink (in microns) | 20 deg Gloss on Glossy Media |
|---|---|---|---|
| 101 | PB15:3 | 0.165 | 3.6 |
| 102 | " | 0.134 | 6.2 |
| 103 | " | 0.087 | 43.1 |
| 104 | " | 0.032 | 64.4 |
| 105 | " | 0.031 | 65.9 |
| 106 | " | 0.031 | 62.4 |
| 107 | PR122 | 0.118 | 11.1 |
| 108 | " | 0.102 | 52.9 |
| 109 | " | 0.017 | 98.9 |
| 110 | " | 0.018 | 98.1 |
| 111 | " | 0.012 | 110 |
| 112 | " | 0.012 | 109 |
| 113 | PY155 | 0.199 | 9.7 |
| 114 | " | 0.014 | 70.9 |
| 115 | " | 0.011 | 89.2 |
| 116 | " | 0.009 | 107 |
| 117 | " | 0.009 | 112 |
| 118 | " | 0.009 | 109 |

It is readily apparent that high levels of gloss on glossy media are only obtained when using smaller sized pigments.

The presence of water soluble amines is detrimental to the operation of the invention. Inventive Black 13 was prepared generally as described above and comprised 0.39% carbon black pigment dispersion (CB-1); 0.09% cyan pigment dispersion (CD-1); 0.12% magenta pigment dispersion (CM-1); 0.45% Surfynol-465; 8% Glycerol; 4% Ethylene Glycol; 2% 1,5-Pentanediol; 2% Pentaerythritol Propoxylate 5/4; 0.3% Polyurethane (PU-1); 0.1% of a benzylmethacrylate-methacrylic acid copolymer having an acid number of about 200 neutralized to 85% with potassium hydroxide; 0.03% biocide with the balance water.

Comparative Black Ink 14 was like Inventive Black Ink 13 except that dimethylethanolamine was employed as the acrylate polymer neutralization agent.

Inventive Black Ink 15 was like Inventive Black Ink 12 except that Acrylate Polymer AP-2 neutralized to 85% with potassium hydroxide was employed.

Comparative Black Ink 16 was like Inventive Black Ink 15 except that dimethylethanolamine was employed as the acrylate polymer neutralization agent.

Inventive Black Ink 17 was generally like Inventive Black Ink 13 except that Acrylic Polymer AP-1 was employed.

Comparative Black Ink 18 was like Inventive Black Ink 17 except that 0.05% triethanolamine was added.

When these six inks were evaluated for firing as described above, the three inventive inks exhibited an average velocity (TTrms) of 15.3 m/s (0.2), 14.7 m/s (0.2) and 12.2 m/s (0.2) respectively while the first two comparative inks would not fire in a stable enough fashion to allow determination of an average velocity and showed very high noise (25.0) and (10.4) respectively and the third comparative ink showed a large decrease in velocity with a doubling of the noise, thus demonstrating the detrimental effect of the presence of a water soluble amine on the operation of the invention.

The invention has been described in detail with particular reference to certain preferred embodiments thereof, but it will be understood that variations and modifications can be effected within the spirit and scope of the invention. The entire content of the patents and publications referred to in this document are incorporated herein by reference.

PARTS LIST

10 Inkjet printer
12 Image Data Source
18 Ink Tanks
20 Recording Media Supply
22 Printed Media Collection
30 Printhead
40 Protective Cover
100 Carriage

What is claimed is:

1. An inkjet printer containing an aqueous inkjet ink, comprising:
   a) at least 50% by weight water;
   b) from 0.1% to 3% by weight, in toto, of dispersed colored pigment exhibiting a median volume weighted $50^{th}$ percentile particle size of less than 0.11 microns, wherein said dispersed pigment is a surfactant dispersed, self-dispersed, or encapsulating-dispersant dispersed pigment;
   c) from 0.1% to 4% by weight of a compound I represented by the following Structure (I):

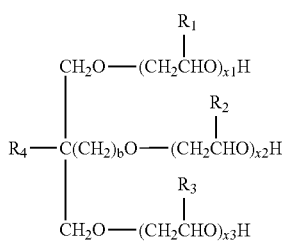

(I)

wherein R₄ is chosen from the group consisting of —H, —C₃, —C₂H₅, —C₃H₇, and —CH₂O(CH₂CHR₅O)$_{x4}$H;
1) provided when R₄ is —H, —CH₃, —C₂H₅, or —C₃H₇, each of R₁, R₂ and R₃ are independently hydrogen or methyl, b is 0 or 1; $x_1$, $x_2$ and $x_3$ are each equal to at least 1, and the sum of $x_1$, $x_2$ and $x_3$ is 3 to 21, and
2) provided when R₄ is —CH₂O(CH₂CHR₅O)$_{x4}$H, each of R₁, R₂, R₃ and R₅ is independently hydrogen or methyl; b is 0 or 1 and the sum $x_1$, $x_2$, $x_3$, and $x_4$ is from 3 to 28;
d) from 0.05% to 3% by weight of a polyurethane latex binder;
e) optionally, a water soluble polyacrylate polymer in an amount less than 3% by weight;
f) provided that the sum of the polyurethane latex binder and any water soluble polyacrylate polymer is not more than 3% by weight; and
g) further provided that the weight ratio of dispersed pigment to the sum of all water soluble polyacrylate polymer and polyurethane latex binder is from 3:1 to 1:2.

2. The inkjet printer of claim 1 wherein the ink comprises a water soluble polyacrylate polymer in an amount less than 3% by weight.

3. The inkjet printer of claim 1 wherein said dispersed pigment is a surfactant dispersed pigment.

4. The inkjet printer of claim 3 wherein said dispersed pigment is surfactant dispersed and the surfactant is a metal salt of oleylmethyltaurate.

5. The inkjet printer of claim 1 wherein said dispersed colored pigment is chosen from the group consisting of cyan, magenta, yellow, red, green, blue, violet, and orange colored pigments.

6. The inkjet printer of claim 1 wherein said dispersed pigment is a black colored pigment.

7. The inkjet printer of claim 1 wherein R₄ is —CH₂O(CH₂CHR₅O)$_{x4}$H and R₅ is hydrogen or methyl.

8. The inkjet printer of claim 1 wherein the compound of structure I is present at from 1% to 3% by weight.

9. The inkjet printer of claim 1 wherein the water soluble polyacrylate polymer exhibits an acid number from 100 to 400 and a weight average molecular weight Mw from 5,000 to 20,000.

10. The inkjet printer of claim 1 wherein polyurethane latex binder exhibits an acid number from 60 to 150 and a weight average molecular weight between Mw from 7,500 to 30,000.

11. The inkjet printer of claim 1 that is free of an ejection disabling quantity, less than 0.05 wt. %, of a water soluble amine.

12. An inkjet ink set comprising at least two distinctly colored inks, at least one comprising:
a) at least 50% by weight water;
b) from 0.1% to 3% by weight, in toto, of dispersed colored pigment exhibiting a median volume weighted 50$^{th}$ percentile particle size of less than 0.11 microns, wherein said dispersed pigment is a surfactant dispersed, self-dispersed, or encapsulating-dispersant dispersed pigment;
c) from 0.1% to 4% by weight of a compound I represented by the following Structure (I):

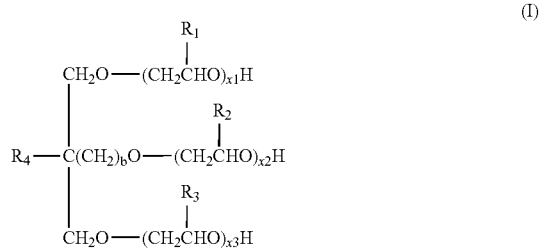

wherein R₄ is chosen from the group consisting of —H, —CH₃, —C₂H₅, —C₃H₇, and —CH₂O(CH₂CHR₅O)$_{x4}$H;
1) provided when R₄ is —H, —CH₃, —C₂H₅, or —C₃H₇, each of R₁, R₂ and R₃ are independently hydrogen or methyl, b is 0 or 1; $x_1$, $x_2$ and $x_3$ are each equal to at least 1, and the sum of $x_1$, $x_2$ and $x_3$ is 3 to 21, and
2) provided when R₄ is —CH₂O(CH₂CHR₅O)$_{x4}$H, each of R₁, R₂, R₃ and R₅ is independently hydrogen or methyl; b is 0 or 1 and the sum $x_1$, $x_2$, $x_3$, and $x_4$ is from 3 to 28;
d) from 0.05% to 3% by weight of a polyurethane latex binder;
e) optionally, a water soluble polyacrylate polymer in an amount less than 3% by weight;
f) provided that the sum of the polyurethane latex binder and any water soluble polyacrylate polymer is not more than 3% by weight; and
g) further provided that the weight ratio of dispersed pigment to the sum of all water soluble polyacrylate polymer and polyurethane latex binder is from 3:1 to 1:2.

13. An inkjet ink set comprising at least two commonly colored inks, at least two inks with the prescribed limitations of claim 12.

14. An inkjet recording method comprising the step of applying to a receiving element an ink, comprising:
a) at least 50% by weight water;
b) from 0.1% to 3% by weight, in toto, of dispersed colored pigment exhibiting a median volume weighted 50$^{th}$ percentile particle size of less than 0.11 microns, wherein said dispersed pigment is a surfactant dispersed, self-dispersed, or encapsulating-dispersant dispersed pigment;
c) from 0.1% to 4% by weight of a compound I represented by the following Structure (I):

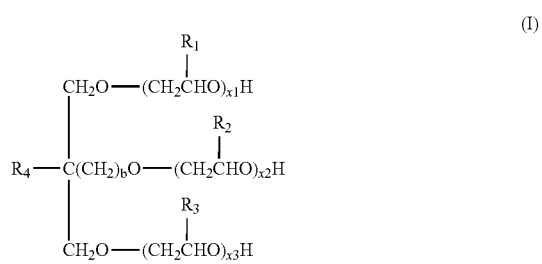

wherein $R_4$ is chosen from the group consisting of —H, —$CH_3$, —$C_2H_5$, —$C_3H_7$, and —$CH_2O(CH_2CHR_5O)_{x4}$H;

1) provided when $R_4$ is —H, —$CH_3$, —$C_2H_5$, or —$C_3H_7$, each of $R_1$, $R_2$ and $R_3$ are independently hydrogen or methyl, b is 0 or 1; $x_1$, $x_2$, and $x_3$ are each equal to at least 1, and the sum of $x_1$, $x_2$ and $x_3$ is 3 to 21, and
2) provided when $R_4$ is —$CH_2O(CH_2CHR_5O)_{x4}$H, each of $R_1$, $R_2$, $R_3$, and $R_5$ is independently hydrogen or methyl; b is 0 or 1 and the sum $x_1$, $x_2$, $x_3$, and $x_4$ is from 3 to 28;

d) from 0.05% to 3% by weight of a polyurethane latex binder;
e) optionally, a water soluble polyacrylate polymer in an amount less than 3% by weight;
f) provided that the sum of the polyurethane latex binder and any water soluble polyacrylate polymer is not more than 3% by weight; and
g) further provided that the weight ratio of dispersed pigment to the sum of all water soluble polyacrylate polymer and polyurethane latex binder is from 3:1 to 1:2.

15. An inkjet recording method according to claim 14, using a printer with a thermal or piezo ejection head, to jet at least two distinct inks, each according to claim 14.

16. An inkjet recording method according to claim 14 wherein said dispersed pigment is a surfactant dispersed pigment.

17. An inkjet recording method according to claim 16 wherein said dispersed pigment is surfactant dispersed and the surfactant is a metal salt of oleylmethyltaurate.

18. An inkjet ink set according to claim 12, wherein said dispersed pigment is a surfactant dispersed pigment.

19. An inkjet ink set according to claim 18, wherein said dispersed pigment is surfactant dispersed and the surfactant is a metal salt of oleylmethyltaurate.

* * * * *